2,743,188
Patented Apr. 24, 1956

2,743,188

PUTTY

Samuel N. Hunter, East St. Louis, Ill., assignor to Hunter Metallic Products Corporation, East St. Louis, Ill., a corporation of Illinois No Drawing. Application April 11, 1952,
Serial No. 281,910

5 Claims. (Cl. 106—287)

This invention relates to compositions for use as putty or the like. In the past putty has commonly been compounded of an inert filler such as talc or whiting, and a wetting and binding agent such as linseed oil. This type of putty has a tendency to lump, it hardens on contact with the air, and has only a fair amount of adhesion to wood, metal and glass.

One of the objects of this invention is to provide a putty which is, and remains, smooth; which remains flexible, soft and usable indefinitely, even when exposed to the air or corrosive atmospheres; which can be pigmented, painted, lacquered, enameled or varnished; which is fire resistant and which has a high adhesion to wood (bare, painted, varnished, enameled or lacquered), glass or metal.

Other objects will become apparent to those skilled in the art in the light of the following description.

In accordance with this invention generally stated a modified clay of the character described in U. S. patent to Hauser, No. 2,531,427 is combined with a liquid chlorinated polyphenyl to produce a putty or cement having all of the desirable characteristics set forth in the objects. The term "organophilic cation-modified onium clay" is used in the specification and claims to mean a modified clay as disclosed in the Hauser patent referred to.

As an illustrative example of this invention an organophilic bentonite is mixed with chlorinated biphenyl containing approximately 54% chlorine, an oily light yellow liquid. Sufficient of the clay is used so that when the clay has swelled it takes up all of the free liquid to form a thick paste of substantially the consistency of fresh putty. More or less of the clay may be used to vary the consistency of the product. Suitable organophilic bentonites are sold commercially under the trademark Bentonite. A satisfactory putty is made in accordance with the illustrative example by adding 14 to 30 parts by weight of 54% chlorine content chlorinated biphenyl to 100 parts of dimethyl dioctadecyl ammonium bentonite.

Other chlorinated polyphenyls may be used. Biphenyls of low chlorine content are cheaper than the 54% chlorine content chlorinated biphenyl, but their evaporation loss is slightly higher. The evaporation loss of 21 and 32% content chlorinated biphenyls is from 1% to 1½% at 100° C. for 6 hours. The evaporation loss of 42% chlorinated biphenyl under the same conditions is .0 to .4%; of 48% chlorine content chlorinated biphenyl .0 to .3%; and of 54% chlorinated biphenyl .0 to .2%. At lower temperatures the evaporation loss is practically negligible. Combinations of chlorinated polyphenyls of different chlorine content may also be used. For example, a combination of 90% chlorinated biphenyl with a chlorine content of 48% and 10% chlorinated biphenyl with 54% chlorine content, or 85% chlorinated biphenyl with 21% chlorine content and 15% chlorinated biphenyl with 48% chlorine content may be used. Also various organic solvents may be used to reduce the viscosity, for example, 90% chlorinated biphenyl with 54% chlorine content may be thinned with 10% toluene or xylene.

Where a greater degree of hardness after application is desired, chlorinated polyphenyls which are normally soft sticky resins, rather than free-flowing liquids, may be used, dissolved in an organic solvent. If it is desired that the putty be fire-proof before application, a suitable chlorinated solvent can be used, such as trichlorethylene. For use with certain of the organophilic modified clays (such as Bentone 18, an alkyl ammonium montmorillonite), which gel with polar type solvents such as ketones, alcohols and esters, one of those solvents may be used. For example, acetone, amyl alcohol, n-butyl alcohol, amyl acetate, butyl acetate, ethyl lactate, ethylene glycol diacetate and the like may be used to dissolve chlorinated polyphenyls which are in the form of sticky resins.

Putty made in accordance with this invention remains soft and pliable under practically any conditions of weather (though they may stiffen somewhat with extreme cold) and after any amount of exposure to dampness and corrosive environments, such as acids or alkalies. Both the chlorinated polyphenyls and the organophilic modified clay constituent are non-hygroscopic and substantially fire-proof. The chlorinated polyphenyls have strong adhesive properties, and the putty produced by their combination with the organophilic modified clay exhibits strong adhesion.

It can be seen that the putty of this invention is not a simple mechanical mixture. The organophilic modified clay swells and takes up the chlorinated biphenyl or solution of solvent and chlorinated polyphenyl to form a smooth, uniform composition which does not subsequently lump or oxidize. Various pigments may be added to such putty to produce various colors or to vary the characteristics of the putty. For example, aluminum, bronze, copper, elemental iron, titanium dioxide, red lead, white lead, barium sulphide, lamp black and numerous other metallic and non-metallic pigments may be used. The chlorinated polyphenyls have a preserving effect on and enhance the brilliance of the pigments. The chlorinated polyphenols are, moreover, compatible with the vehicles of paints, lacquers, enamels and varnishes, which may be applied to these putties.

Various fillers, extenders and additives such as calcium carbonate, talc, slate dust, steatite, pyrophyllite and amorphous silica may be added to the putty to make it cheaper and stiffer and, to some extent, color it.

Thus it can be seen that a putty or cement is produced which remains soft and usable indefinitely, even when exposed to the air or other corrosive atmosphere, which is water-proof, substantially fire-proof, and weather-proof, which remains pliable and adhesive after its application, which can be pigmented, painted, lacquered or varnished and which does not lump or scum.

Having thus described my invention what is claimed and desired to be secured by Letters Patent is:

1. A putty comprising liquid chlorinated biphenyl and organophilic cation-modified onium clay.
2. A putty comprising liquid chlorinated biphenyl and organophilic cation-modified onium bentonite.
3. A putty comprising liquid chlorinated biphenyl organophilic cation-modified onium clay, and pigment.
4. A putty comprising liquid chlorinated biphenyl containing no more than 54% chlorine, and organophilic cation-modified onium clay.
5. A putty comprising 14 to 30 parts by weight 54% chlorine content chlorinated biphenyl and 100 parts by weight dimethyl dioctadecyl ammonium bentonite.

(References on following page)

References Cited in the file of this patent

UNITED STATES PATENTS

| | | |
|---|---|---|
| 2,150,031 | Hatfield | Mar. 7, 1939 |
| 2,486,012 | Ernst | Oct. 25, 1949 |
| 2,531,427 | Hauser | Nov. 28, 1950 |
| 2,559,398 | Capell | July 3, 1951 |
| 2,622,987 | Ratcliffe | Dec. 23, 1952 |

OTHER REFERENCES

"British Plastics," Nov. 1951, pp. 190, 191 and 192.

Monsanto: "Plasticizers and Resins," Monsanto Chemical Co., St. Louis, U. S. A. (1940), pages 32, 33, 34, 36 to 40.

UNITED STATES PATENT OFFICE

CERTIFICATE OF CORRECTION

April 24, 1956

Patent No. 2,743,188

Samuel N. Hunter

It is hereby certified that error appears in the printed specification of the above numbered patent requiring correction and that the said Letters Patent should read as corrected below.

Column 1, line 49, for "Bentonite" read --Bentone--; line 58, after "32%" insert --chlorine--; column 2, line 42, for "polyphenols" read --polyphenyls--.

Signed and sealed this 10th day of July 1956.

(SEAL)
Attest:

KARL H. AXLINE
Attesting Officer

ROBERT C. WATSON
Commissioner of Patents